United States Patent
Maennel et al.

(10) Patent No.: US 7,516,445 B2
(45) Date of Patent: Apr. 7, 2009

(54) LOCATING SOURCE CODE WHEN STOPPING IN A DEBUGGER

(75) Inventors: Hartmut Maennel, Issaquah, WA (US); Habib Heydarian, Kirkland, WA (US); Stephen W. Provine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 11/171,811

(22) Filed: Jun. 30, 2005

(65) Prior Publication Data

US 2007/0006155 A1 Jan. 4, 2007

(51) Int. Cl.
 G06F 9/44 (2006.01)
(52) U.S. Cl. .......................... 717/125; 717/124; 717/129
(58) Field of Classification Search ......... 717/124–125, 717/129
See application file for complete search history.

(56) References Cited

U.S. PATENT DOCUMENTS

| | | | |
|---|---|---|---|
| 5,371,747 A * | 12/1994 | Brooks et al. .................. | 714/38 |
| 5,410,648 A * | 4/1995 | Pazel ........................... | 717/124 |
| 6,026,362 A * | 2/2000 | Kim et al. ..................... | 717/125 |
| 7,203,927 B2 * | 4/2007 | Al-Azzawe et al. .......... | 717/124 |
| 7,216,336 B1 * | 5/2007 | Ezra et al. .................... | 717/124 |

OTHER PUBLICATIONS

Cheng et al., A Portable Debugger for Parallel and Distributed Programs, 1994, IEEE, pp. 723-732.*
Goldszmidt et al., "Interactive Blackbox Debugging for Concurrent Languages", 1988, ACM, SIGOPS, pp. 271-282.*
Hood, Robert, "The pd2d Project: Building a Portable Distributed Debugger", 1996, ACM, SPDT '96, pp. 127-136.*

* cited by examiner

Primary Examiner—Wei Y Zhen
Assistant Examiner—Ryan D Coyer
(74) Attorney, Agent, or Firm—Woodcock Washburn LLP

(57) ABSTRACT

A method for automatically retrieving source code during software debugging sessions using a development system includes stopping in an object with compiled code where the compiled code is associated with corresponding source code via a debugging support file. The compiled code can be run on different hosts. During a debugging session, a local debugger portion of the software in the development system requests a unique resource locator for the source code. A remote software debugger portion on a host responds by providing a hosttype, which specifies the host specific search algorithm, and the original path for the source code. A development system host access component requests a file with matching name and original path from the host. An original source file checksum is compared with a retrieved checksum. Upon a match, the retrieved source code is stored in the development system and accessed for user display.

20 Claims, 3 Drawing Sheets

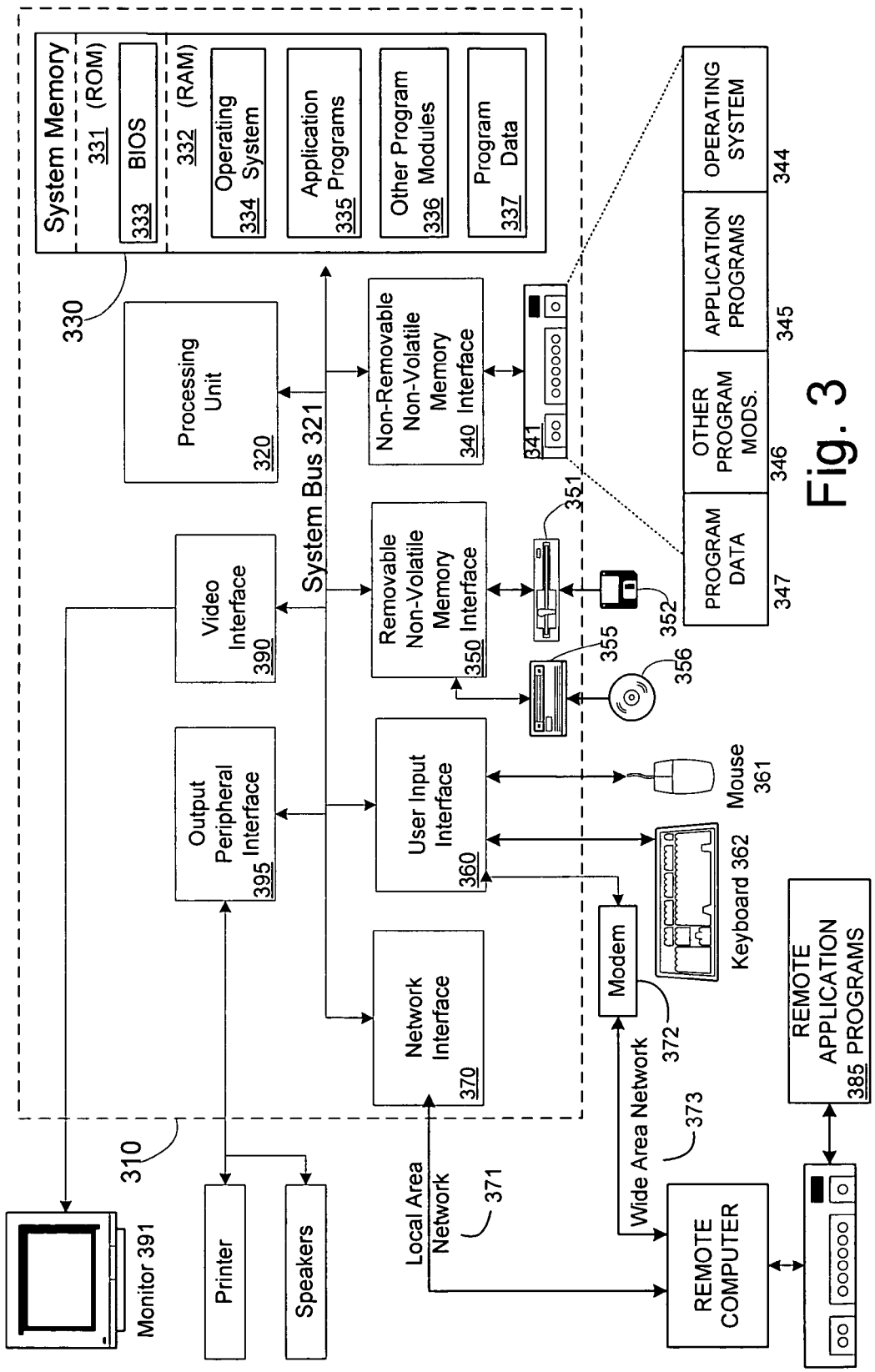

LOCATING SOURCE CODE WHEN STOPPING IN A DEBUGGER

FIELD OF THE INVENTION

The invention relates generally to the field of software development, and more particularly to the location of source files during application debugging.

BACKGROUND OF THE INVENTION

Developers often place breakpoints into the source code of their compiled programs under development. These breakpoints can cause the compiled program under test to stop execution in order to perform some function such as allowing the developer to gather information about computer registers and the progress of different threads. Breakpoints can be used to discover why a section of code is failing or doesn't work correctly. Often, finding the code is a non-trivial task because two separate computers may be involved.

For example, if the program is being debugged on one machine, but the source code exists on another machine, a straightforward search for the source code on the local machine will not find the file of interest. Accordingly, she will have to identify the location of the code on a different machine, possibly transport it to the development system and then load the source code onto the development system in order to view the source code file of interest. This technique is labor and time intensive.

Thus there is a need for a method and system by which a developer may easily access source code of interest such that if the source code is located on a different machine, it may still be accessible. The invention addresses the aforementioned needs and solves them with various systems, methods and techniques that also offer other advantages for automating the acquisition of source code in a software debugging environment.

SUMMARY OF THE INVENTION

The current invention addresses the need for an automatic system and method of acquiring source code in a development system where the program under test and source code is resident on a host, such as a database, which is on a machine that was not used to compile the source code; and the organization and storage of the source files in the host is fundamentally different from the organization and storage of the original source files at the time of compilation. The program under test is designed to operate in multiple runtime environments. In one embodiment, the user may be debugging a T-SQL or SQLCLR object running in the Microsoft SQL Server® environment. When the debugger is in break mode, the user steps from the current location to another SQLCLR object. However, the source code for the SQLCLR-object that the user is stepping into is not currently open in Visual Studio®. In the prior art, the user had to locate the source code for the SQLCLR object manually and open it in Visual Studio® prior to stepping into it.

The current invention avoids this manual step by automatically finding the source code file on the host, for example in a separate database. In one embodiment, a local debugger in a development system automatically requests, from a remote debugger in a database server, a location for the desired source file. The remote debugger software generates a unique resource locator of the form: hosttype:://<path> using the original source code location information from a symbol file and a host name. This allows the debugger to use the same file path as was originally used at the compiler to find source code in a host-specific manner. Note that the compiler machine is assumed to be a machine that is not part of either the development system or the database server. At compile time the compiler does not need to know in which environment the resulting files will be deployed, and in fact the same debugging support files can be used in different hosts, e.g. in a database on one machine and in a traditional application on a different machine. Upon receipt of the original location, the local debugger software checks locally available drives to find the desired software in a location that is the same or similar to the original location. Assuming that the desired source file is not found, the local debugger software asks a host access component to query a database server for the file. If a file of the same name and matching original location is found, irrespective of where and how the file is stored in the database, then the checksum of the original source file is compared to a checksum of the discovered source file. Assuming there is a match, the source file is locally stored and then subsequently retrieved by the local debugger package. In this manner, there is no need for user intervention to find source code.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 is a block diagram showing an exemplary computing environment in which aspects of the invention may be implemented.

DETAILED DESCRIPTION OF ILLUSTRATIVE EMBODIMENTS

Figure 1:
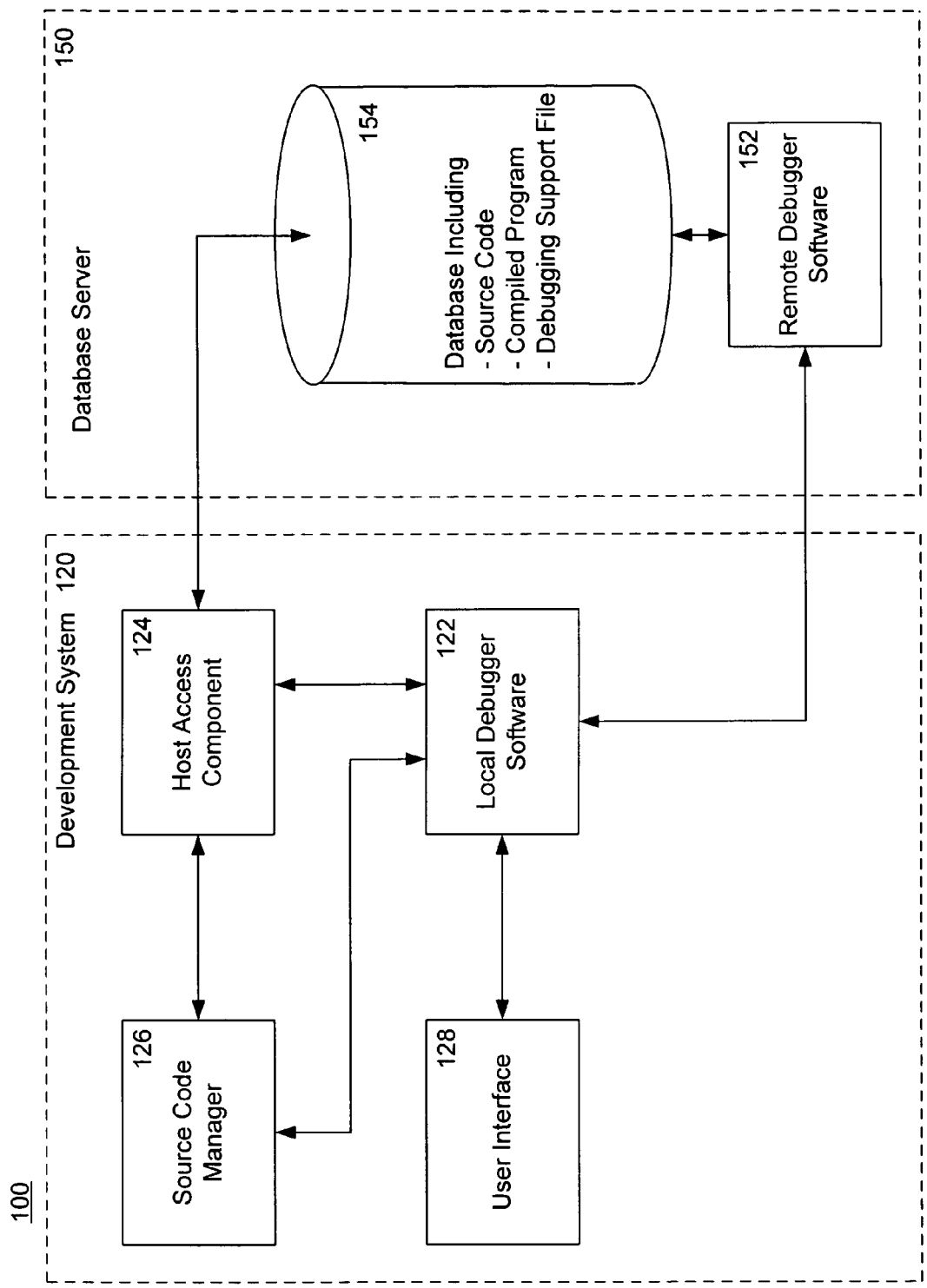
FIG. 1 depicts an example block diagram architecture of an embodiment of the current invention.

FIG. 1 depicts an example system embodiment of the present invention. The example system 100 includes at least two computing machines; a development system 120 and a database server 150 which includes the target software under test. The target software is designed to run in multiple types of runtime environments. The development system 120 includes local debugger software 122 for accepting user interface 128 inputs and coordinating activities of the development system 120. Also included are a host access component 124 to assist in the retrieval of files and in the presentation of those files to the local debugger 122 and user interface 128. The source code manager 126 manages the local storage of files used by the software developer. In the context of the present invention, local storage of files, such as retrieved source code files, may be stored by the source code manager 126 in its local storage area.

Not shown in FIG. 1 is a compiler hosted by a computing machine that is different from either the development system or the database server. The compiler computing machine is a machine that is first used to develop and compile source code. At the time of compilation of source code two file types are generated from the source code: The compiled source code, also known as a binary file, and a debugging support file, also known as a symbol file. These files are independent from the host environment that is used to run the program. Differing runtime environments may include, a .Net runtime hosted by a Microsoft Windows Operating software or a .Net runtime hosted by a Microsoft SQL Server 2005 software, available from Microsoft® Corporation. The source code represents the code generated by the developer to produce some useful software function. The compiled code is a file derived from the source code compiled for the machine or run-time environment. The symbol file or debugging support file is a file which contains information that maps the compiled code to the source code such that one or more lines of compiled code may be attributed to one or more lines of source code. The debugging support file's mapping to the source files uses the original location of the source files and a checksum to identify these files, and the content of the source files are stored in the database together with the information about the original location. The checksum can be computed from the content, so it does not have to be stored explicitly.

As an aspect of the present invention, it is assumed that the three file types are fixed at compile time and that at least these files are transferred to the database 154 within the database server 150. In addition, remote debugger software 152, which has access to at least the debugging support file, is communicatively connected to the local debugger software 122 of the development system.

In one embodiment, a user interface 128 may be used by a user to debug either a T-SQL or SQLCLR object running in the database server 150 which may be a Microsoft SQL Server®. The development system 120 may utilize a version of Visual Studio® running in a MS Windows®. SQL Server®, Visual Studio® and MS Windows® are available through Microsoft® in Redmond, Wash. When the debugger 122 is in break mode, the user can step from the current location to another SQLCLR object. However, the source code for the SQLCLR object that the user is stepping into may only exist in the database and is not currently open in Visual Studio®. In one embodiment, the host access component is part of the Visual Database Tools of Visual Studio® also available from Microsoft®. Without the current invention, the user had to locate the source code for the SQLCLR object manually and open it in Visual Studio® prior to stepping into it. However, the current invention provides an automatic mechanism whereby the debugger software 122 can invoke the host access component 124 to show the source code for the SQLCLR object that the user stepped into.

Figure 2:
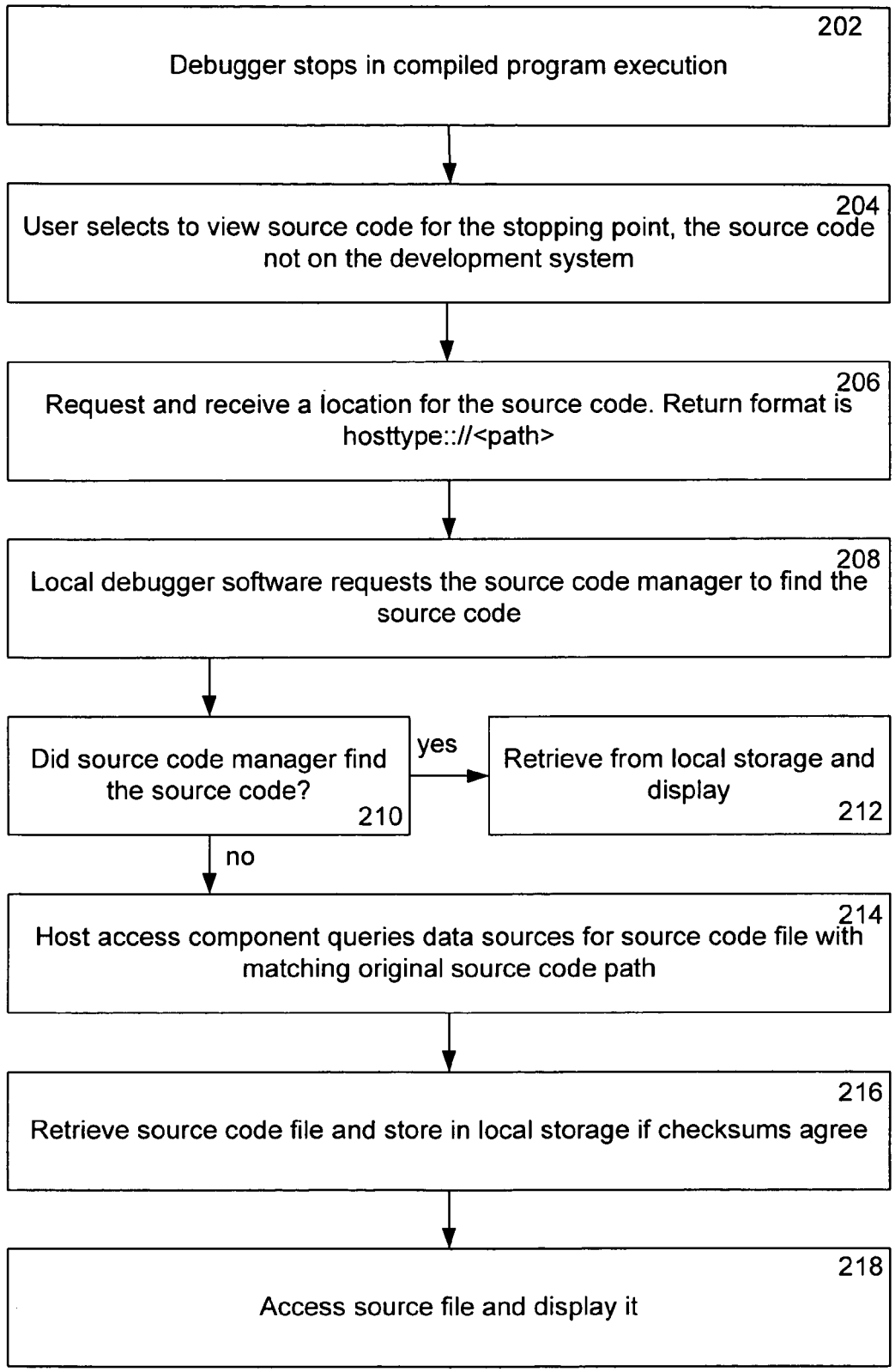
FIG. 2 depicts an example flow diagram architecture of a method according to aspects of the invention.

FIG. 2 depicts a flow diagram 200 of an example embodiment method which employs aspects of the current invention. In the context of the debugging environment where a user is running compiled code, stopping points are commonly encountered when running compiled code. The stopping points allow the user to inspect the operation of the compiled code as the code progresses through its functions. Stopping points in the compiled code may result from breakpoints entered into areas of interest entered into the program under test or may result from other user interaction with the debugger or development system. The local debugger software in the development system detects a stopping point in the compiled program execution (step 202). In this instance, the user normally wants to see the source code related to the stopping point (step 204). In some instances, the stopping point may be related to a subroutine of interest to the user. Stepping into a new source code related object or hitting a stopping point in a new object may trigger a request for a location of a portion of the source code (step 206) that is not present on the development system cache or other easily accessible storage area. The remote debugger software returns a location for the absent source code in a host-specific manner (step 206).

In one aspect of the invention, the compiled code may be executed on multiple runtime environments. In one example embodiment, the compiled code is .NET® compatible and runs in SQL Server 2005®. In this configuration, a user may be debugging T-SQL or SQLCLR code. Upon stepping into an object, the local debugger package asks the remote debugger software for the original location of the source code associated with the object. The returned location includes the location of the source code on a compiler machine, possibly different from the current debugger or database server machines, that originally compiled the source file. The returned information also includes a checksum of the source file. This information is obtained from the remote debugger software via its access to the debugging support file. It is noteworthy that the location of the source file, in terms of directory location, may not exist on either the database server or the debugger machine. The return location of the source code may be in a unique resource locator format. The general format may be of the form:

hosttype:://<path>

In one embodiment where the host type is a version of Microsoft SQL Server®, the step 206 locator response may take the following form:

mssqlclr:://C:\dir\Sourcefile.cs

Here, a prefix, mssqlclr, is placed as a hosttype to specify the method for a search if the Sourcefile.cs is not available in local memory. The C:\dir\Sourcefile.cs is the original path for the Sourcefile.cs file when it was initially compiled on a machine that is possibly different from the development system. This original path is always different from the current storage place for the source file, since this location is not a location in a database.

After the debugger package receives the unique resource locator, the local debugger package of the development system requests the relevant portion of the source code (step 208). Initially, the debugger package asks the source code manager for the files (step 210). In one embodiment, the local debugger requests the source code file from the original directory. If that does not exist, the debugger asks the source code manager to find a source file of the same name in the files of the development system including any opened connections or other available resources. If such a source code file is found, and the checksum of the discovered file matches with the original source file checksum, then this file is displayed (step 212).

If the desired source file is not available as one of the local or already opened files, then the debugger will ask the host access component to locate the source code file in the host-specific manner. In one embodiment, the host access component looks at all opened connections, searches all assemblies, and compares the original path of each source file of that assembly to the given original path. The host access component returns a file of the given source code file name and matching path and the local debugger verifies that the checksum passed from the remote to the local debugger associated with the original source file at the time of compilation agrees with the checksum of the retrieved file. If the checksums agree, then the retrieved file is stored in a local storage (step 216). After the file is stored, the source file may be accessed and displayed using the viewer (step 218).

Exemplary Computing Device

FIG. 3 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 3 thus illustrates an example of a suitable computing system environment 300 in which the embodiments of the invention may be implemented, although as made clear above, the computing system environment 300 is only one example of a suitable computing environment and is not intended to suggest any limitation as to the scope of use or functionality of an embodiment of the invention. Neither should the computing environment 300 be interpreted as having any dependency or requirement relating to any one or combination of components illustrated in the exemplary operating environment 300.

With reference to FIG. 3, an exemplary system for implementing an embodiment of the invention includes a general purpose computing device in the form of a computer system 310. Components of computer system 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 310 typically includes a variety of computer readable media. Computer readable media can be any available media that can be accessed by computer system 310 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer system 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer system 310 may also include other removable/non-removable, volatile/nonvolatile computer storage media. By way of example only, FIG. 3 illustrates a hard disk drive 341 that reads from or writes to non-removable, non-volatile magnetic media, a magnetic disk drive 351 that reads from or writes to a removable, nonvolatile magnetic disk 352, and an optical disk drive 355 that reads from or writes to a removable, nonvolatile optical disk 356, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3 provide storage of computer readable instructions, data structures, program modules and other data for the computer system 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer system 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390, which may in turn communicate with video memory (not shown). In addition to monitor 391, computer systems may also include other peripheral output devices such as speakers 397 and printer 396, which may be connected through an output peripheral interface 395.

The computer system 310 may operate in a networked or distributed environment using logical connections to one or more remote computers, such as a remote computer 380. The remote computer 380 may be a personal computer, a server, a router, a network PC, a peer device or other common network node, and typically includes many or all of the elements described above relative to the computer system 310, although only a memory storage device 381 has been illustrated in FIG. 3. The logical connections depicted in FIG. 3 include a local area network (LAN) 371 and a wide area network (WAN) 373, but may also include other networks/buses. Such networking environments are commonplace in homes, offices, enterprise-wide computer networks, intranets and the Internet.

When used in a LAN networking environment, the computer system 310 is connected to the LAN 371 through a network interface or adapter 370. When used in a WAN networking environment, the computer system 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer system 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFTS's .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method to automatically find a source file while debugging software. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method for retrieving source code during a software debugging session, the debugging session using compiled code capable of running in different runtime environments, the method comprising:

detecting a stopping point related to a compiled program executing in a target runtime host environment, the stopping point detected in a development system comprising local debugger software, the local debugger software communicating with remote debugger software accessing the host environment, the host environment storing a copy of original source code files together with location information corresponding to the original source code files, the compiled program, and a debugging support file, the debugging support file comprising information which maps parts of the compiled program to source code lines, wherein the source code files are characterized by corresponding original source code file locations and corresponding source file checksums, wherein the compiled program and the debugging support file are compatible with multiple runtime host environments;

selecting to view a portion of source code of the compiled program corresponding to the detected stopping point, the source code portion absent from the development system;

requesting a location for the source code portion of the compiled program, the request generated by the local debugger software and sent to the remote debugger software, wherein the source code is located remotely from the remote debugging software, and wherein the remote debugging software accesses the debugging support file and acquires the source code portion file location and corresponding source file checksum stored in the runtime host environment;

receiving, by the local debugging software, a host-specific resource locator for the source code portion, wherein the host-specific resource locator comprises a unique resource locator including a host type prefix and an original path;

searching for a matching file of the source code portion using the host-specific resource locator; and displaying the source code portion.

2. The method of claim 1, wherein detecting a stopping point related to a compiled program executing in a target runtime host environment comprises detecting a stopping point related to a compiled program executing in a database server.

3. The method of claim 2, wherein searching for a matching file of the source code portion using the host-specific resource locator comprises generating a query against the database server using the host-specific resource locator.

4. The method of claim 3, wherein generating a query comprises using a host access component, by the local debugger, to generate the query to the database server to find the source code portion based on the host-specific resource locator.

5. The method of claim 3, wherein searching for a matching file of the source code portion using the host-specific resource locator comprises checking development system accessible files for the source code portion using the resource locator before sending the query to the database server.

6. The method of claim 1, wherein searching for a matching file of the source code portion using the host-specific resource locator comprises searching for a matching file using the resource locator which comprises a host prefix, an original compiling computer drive designator, an original compiling computer directory file name and a source code portion file name.

7. The method of claim 1, wherein detecting a stopping point related to a compiled program executing in the development system comprises detecting a stopping point related to a compiled program that is created to run in any .Net-based runtime environment, where the .Net runtime may be hosted by one of a windows-type operating system, a SQL database server and another .Net host.

8. The method of claim 1, wherein displaying the source code portion further comprises:

comparing a checksum of the source code portion with the checksum of the original source code; and displaying the source code portion if the checksums match.

9. The method of claim 8, wherein displaying the source code portion comprises:

locally storing the source code portion if the checksums match; and retrieving the locally stored source code portion for display.

10. A system for retrieving source code in a development environment, the system comprising:

a software development system comprising:
  a local debugger software package;
  a host access component for accessing and viewing files;
  a local storage area;
  a user interface;

a database server comprising:
  a database having a source code file together with location information corresponding to the source code file, a compiled program and a debugging support file comprising a source code file location and corresponding source file checksum, wherein the source code, the compiled program and the debugging support file are compatible with multiple runtime environments;

remote debugger software having access to the debugging support file; wherein the remote debugger software is located remotely from both the software development system and the database server; and a processor having access to memory, the memory having instructions which when executed, perform a method comprising:

detecting a stopping point related to a compiled program executing in the database server;

selecting to view, using local debugger software, a portion of source code of the compiled program corresponding to the detected stopping point, the source code portion absent from the development system;

requesting a resource locator for the source code portion; the request generated by the local debugger software and sent to remote debugger software in the database server;

receiving, by the local debugger software, a resource locator of the source code and an the source file checksum of the source code portion from the remote debugger software, the resource locator and source file checksum provided using the debugging support file;

sending a query to the database server for the source code portion, the query comprising a unique resource locator including a path of the source code portion and a host prefix;

receiving source code portion from the database server; comparing a checksum of the received source code portion with the source file checksum of the source code portion and locally storing the received source code portion if the checksums match; and accessing the locally stored source code portion for viewing.

11. The system of claim 10, wherein the user interface is used enter stopping points into the compiled code.

12. The system of claim 10, wherein the method step of sending a query to the database server for the source code portion comprises requesting the host access component to generate a query to the database to find the source code file portion based on the resource locator.

13. The system of claim 10, wherein the resource locator comprises a host prefix, a computer drive designator, a computer directory file name and a source code file name.

14. The system of claim 10, wherein accessing the locally stored source code portion for viewing comprises requesting the source code file from local storage and viewing the file using the host access component.

15. A computer-readable medium having computer-executable instructions for retrieving a source code file from a target runtime host environment, the computer-executable instructions comprising instructions for:

selecting to view a portion of source code of a compiled program corresponding to be detected stopping point, the source code portion absent from a development system, the development system comprising local debugger software, the local debugger software communicating with remote debugger software accessing the host environment, the host environment storing a copy of original source code files together with location information corresponding to the original source code files, the compiled program, and a debugging support file, the debugging support file comprising information which maps parts of the compiled program to source code lines, wherein the source code files are characterized by corresponding original source code file locations and corresponding source file checksums, wherein the compiled program and the debugging support file are compatible with multiple runtime host environments;

requesting a location for the source code portion of the compiled program, the request generated by the local debugger software and sent to the remote debugger software, wherein the source code is located remotely from the remote debugger software, wherein debugging software accesses the debugging support file and acquires the source code portion file location and corresponding source file checksum stored in the runtime host environment;

receiving, by the local debugging software, a host-specific resource locator for the source code portion, wherein the host-specific resource locator comprises a unique resource locator including a host type prefix and an original path;

searching for and retrieving a matching file of the source code portion using the host-specific resource locator;

comparing a checksum of the received source code portion with the corresponding source file checksum and locally storing the received source code portion if the checksums match; and displaying the source code portion.

16. The computer-readable storage medium of claim 15, wherein the computer-executable instructions further comprise instructions for:

encountering a stopping point related to the compiled code executing in the target runtime host environment, the stopping point detected in the development system.

17. The computer-readable storage medium of claim 16, wherein encountering the stopping point related to the compiled code executing in the target runtime host environment comprises detecting a stopping point related to a compiled program that is created to run in any .Net-based runtime environment, where the .Net runtime is hosted by at least one of a windows-type operating system, a SQL database server and another .Net host.

18. The computer-readable storage medium of claim 15, wherein searching for a matching file of the source code portion using the host-specific resource locator comprises generating a query against a database server using the host-specific resource locator.

19. The computer-readable storage medium of claim 18, wherein the step of searching for the matching file of the source code portion using the host-specific resource locator comprises checking development system accessible files for the source code portion using the resource locator before sending the query to the database server.

20. The computer-readable storage medium of claim 15, wherein searching for the matching file of the source code portion using the host-specific resource locator comprises searching for a matching file using the resource locator which comprises a host prefix, an original compiling computer drive designator, an original compiling computer directory file name and a source code portion file name.

* * * * *